United States Patent
Wesselkamper et al.

(10) Patent No.: US 11,582,021 B1
(45) Date of Patent: Feb. 14, 2023

(54) PROTECTION AGAINST DIFFERENTIAL POWER ANALYSIS ATTACKS INVOLVING INITIALIZATION VECTORS

(71) Applicant: Xilinx, Inc., San Jose, CA (US)

(72) Inventors: James D. Wesselkamper, Albuquerque, NM (US); Nathan A. Menhorn, Albuquerque, NM (US); Jason J. Moore, Albuquerque, NM (US)

(73) Assignee: XILINX, INC., San Jose, CA (US)

( * ) Notice: Subject to any disclaimer, the term of this patent is extended or adjusted under 35 U.S.C. 154(b) by 595 days.

(21) Appl. No.: 16/690,097

(22) Filed: Nov. 20, 2019

(51) Int. Cl.
| | |
|---|---|
| *H04L 9/06* | (2006.01) |
| *G11C 11/56* | (2006.01) |
| *G11C 17/14* | (2006.01) |
| *G11C 17/16* | (2006.01) |
| *H04L 9/00* | (2022.01) |

(52) U.S. Cl.
CPC ........ *H04L 9/0618* (2013.01); *G11C 11/5628* (2013.01); *G11C 17/146* (2013.01); *G11C 17/16* (2013.01); *H04L 9/003* (2013.01)

(58) Field of Classification Search
CPC ... H04L 9/0618; H04L 9/003; G11C 11/5628; G11C 17/146; G11C 17/16
See application file for complete search history.

(56) References Cited

U.S. PATENT DOCUMENTS

| | | | |
|---|---|---|---|
| 9,270,469 B2 | 2/2016 | Moore | |
| 10,855,477 B2 * | 12/2020 | Hung | ........................ G09C 1/00 |
| 2011/0138192 A1 * | 6/2011 | Kocher | ..................... G06F 8/71 |
| | | | 713/189 |
| 2019/0394021 A1 * | 12/2019 | Awad | .................... G06F 21/602 |

* cited by examiner

*Primary Examiner* — Philip J Chea
*Assistant Examiner* — Austin W Collier
(74) *Attorney, Agent, or Firm* — Crawford Maunu PLLC

(57) ABSTRACT

Disclosed approaches for validating initialization vectors determining by a configuration control circuit whether or not an input initialization vector is within a range of valid initialization vectors. In response to determining that the initialization vector is within the range of valid initialization vectors, the configuration control circuit decrypts the ciphertext into plaintext using the input initialization vector and configures a memory circuit with the plaintext. In response to determining that the first initialization vector is outside the range of valid initialization vectors, the configuration control circuit signals that the first initialization vector is invalid.

20 Claims, 5 Drawing Sheets

PROTECTION AGAINST DIFFERENTIAL POWER ANALYSIS ATTACKS INVOLVING INITIALIZATION VECTORS

TECHNICAL FIELD

The disclosure generally relates to approaches for protecting against differential power analysis attacks on decryption circuits that use initialization vectors.

BACKGROUND

Businesses devote significant resources to developing and implementing designs targeted for programmable electronic devices, such as field programmable gate arrays (FPGAs), system-on-chips (SoCs), system-in-packages (SiPs), and adaptive compute acceleration platforms (ACAPs). The implemented designs are sometimes referred to as configuration images and can include configuration data for programmable logic and/or executable program code. The configuration images are often protected using various encryption techniques.

The Advanced Encryption Standard-Galios/Counter Mode (AES-GCM) approach is sometimes used to protect configuration images. AES-GCM provides both authentication and confidentiality and is recognized as being efficient and fast. AES-GCM involves combining a block number with an initialization vector and encrypting the result with a block cipher, which is then XOR'd with configuration image plaintext to produce ciphertext. The same initialization vector is used for decryption of the ciphertext.

Unauthorized parties may attempt to obtain proprietary information about a design by performing differential power analysis (DPA) to learn the value of a secret key. Once the secret key has been discovered, the key can be used to decrypt ciphertext of a design. A DPA attack is a particular type of side-channel attack where the parameters of the power system are analyzed to infer operational properties of a secure element (e.g., cryptography logic). The analyzed properties can be statistically analyzed to derive information about secret keys used by the secure element. A DPA attack on AES-GCM ciphertext can involve inputting a sequence of different initialization vectors and analyzing power attributes during processing of the initialization vectors.

SUMMARY

A disclosed method includes inputting a first initialization vector and associated ciphertext to a configuration control circuit. The configuration control circuit determines whether or not the first initialization vector is within a range of valid initialization vectors. I in response to determining that the first initialization vector is within the range of valid initialization vectors, the configuration control circuit uses the first initialization vector to decrypt the ciphertext into first plaintext. The configuration control circuit configures a memory circuit with the first plaintext after the decrypting. In response to determining that the first initialization vector is outside the range of valid initialization vectors, the configuration control circuit signals that the first initialization vector is invalid.

A disclosed circuit arrangement includes a configuration control circuit, a memory circuit, and storage circuitry configured to store an initialization control vector that specifies a range of valid initialization vectors. The configuration control circuit is configured to input a first initialization vector and associated ciphertext and to determine whether or not the first initialization vector is within the range of valid initialization vectors. The configuration control circuit is configured to decrypt the ciphertext into first plaintext using the first initialization vector in response to determining that the first initialization vector is within the range of valid initialization vectors and to store the first plaintext in the memory circuit. In response to determining that the first initialization vector is outside the range of valid initialization vectors, the configuration control circuit signals that the first initialization vector is invalid.

Other features will be recognized from consideration of the Detailed Description and Claims, which follow.

BRIEF DESCRIPTION OF THE DRAWINGS

Various aspects and features of the disclosed methods and circuits will become apparent upon review of the following detailed description and upon reference to the drawings in which.

DETAILED DESCRIPTION

Figure 1:
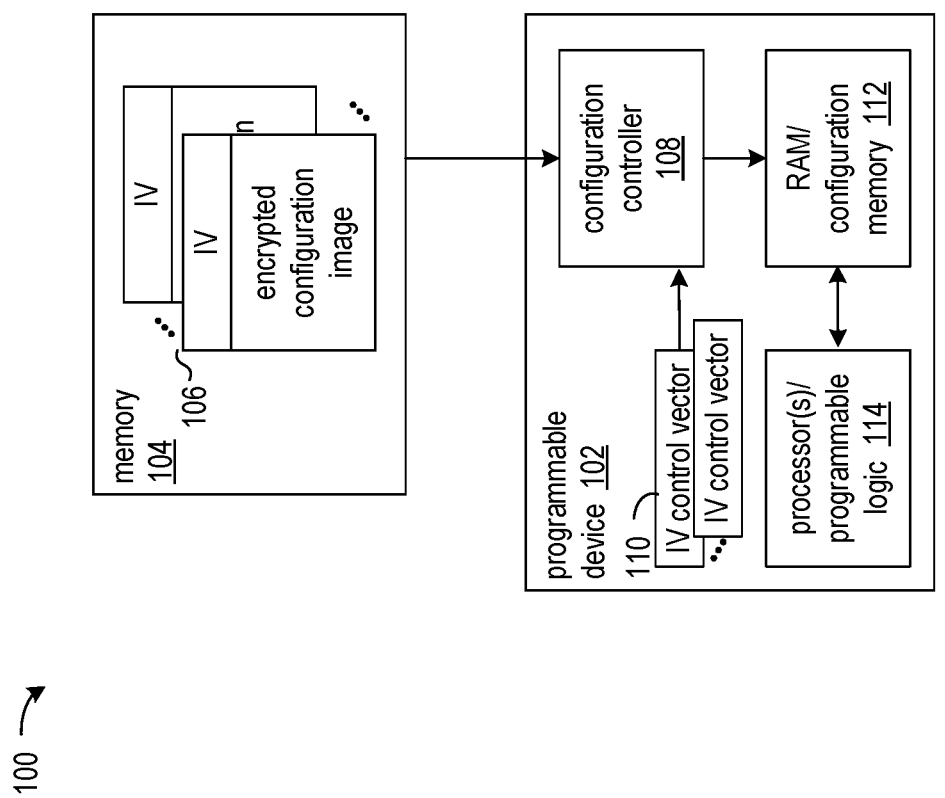
FIG. 1 shows an exemplary system in which the disclosed methods and circuitry can be used to support the use of different IVs for different configuration images.

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

Some prior approaches to protecting against DPA attacks on ciphertext encrypted by AES-GCM involve authentication of the initialization vector (IV) before commencing decryption or permanently programming a single IV. Authentication of an input IV can be unsuitable because the authentication processes may be unavailable during boot time, return merchandise authorization restrictions may limit authentication, or the cryptographic strength of asymmetric algorithms may be unsuitable.

With an approach involving a permanent IV, the system can lock out attempts at decryption using different IVs if decryption is unsuccessful after a certain number of failures. However, a single, permanent IV may be unsuitable in some applications. For example, field upgrades of devices use different configuration images, and security may be compromised if the same IV is used for the different configuration images.

Various aspects of the disclosed approaches allow use of different IVs for AES-GCM encryption of different configuration images, while providing protection against DPA attacks. According to the disclosed approaches, a configuration control circuit determines whether or not an input IV is within a recognized range of values of IVs. In response to determining that the initialization vector is within the range of valid initialization vectors, the configuration control circuit initiates AES-GCM decryption using the input IV. Once the configuration control circuit has decrypted the configuration image ciphertext into plaintext, the configuration control circuit configures a memory circuit with the plaintext. In response to determining that the input initialization vector is outside the recognized range of IV values, the configuration control circuit signals that the input IV is invalid. The approach by which the valid range of IVs is specified allows invalidation of the entire current range or further limiting the current range.

FIG. 1 shows an exemplary system 100 in which the disclosed methods and circuitry can be used to support the use of different IVs for different configuration images. The system can include a programmable device 102 that is communicatively coupled to a memory arrangement 104. The programmable device can be an FPGA, an SoC, an SiP or any other type of electronic device in which AES-GCM encryption is used to protect configuration images targeted to the device.

The memory arrangement 104 can be coupled directly to the programmable device via a bus hierarchy and/or a local or wide area network. The memory arrangement can store multiple encrypted configuration images 106. The encryption of each configuration image can be based on a different IV, and the different IVs can be stored in association with the encrypted configuration images. The multiple encrypted configuration images can include identical copies to provide alternatives in the event that a configuration image becomes corrupted. Alternatively or in addition, the configuration images can include different versions that include enhancements, fixes, and different sets of enabled features.

The programmable device 102 includes a configuration controller 108, a storage circuit 110 for storage of one or more IV control vectors, a memory circuit 112, and processing circuitry 114, such as one or more microprocessors and/or programmable logic. The memory circuit 112 can be configuration memory for programmable logic or RAM for storage of executable program code.

The configuration controller can be a microprocessor that is configured to decrypt ciphertext and load plaintext data into the memory arrangement 112. The configuration controller is coupled to the memory arrangement 104 and is configured to input ciphertext, such as one of the encrypted configuration images 106, and an associated IV. The decryption logic of the configuration controller determines whether or not the input initialization vector is within a range of valid initialization vectors based on the IV control vector 110. In response to determining that the input initialization vector is within the range of valid initialization vectors, the configuration controller decrypts the encrypted configuration image into plaintext using the input initialization vector. In response to successful decryption of the ciphertext, the configuration controller stores the plaintext in the memory circuit 112, which can be configuration memory of programmable logic circuitry or a RAM for storing program code that executable by a processor.

In response to determining that the first initialization vector is outside the range of valid initialization vectors, the configuration controller signals that the IV is invalid. The configuration controller can be configured to retry with another configuration image and IV if the IV is invalid. The configuration controller can input another one of the encrypted configuration images and the associated IV, and then repeat validation of the newly input IV using the IV control vector 110. If the IV is within the allowed range, the configuration controller can decrypt the newly input ciphertext and store the resulting plaintext in the memory 112. If the newly input IV is outside the allowed range, the configuration controller can try another IV and associated encrypted configuration image. The configuration controller can be alternatively or also configured to cease operations if an IV is out of range or after some number of input IVs have been rejected.

Each IV control vector can be stored in a set of one-time programmable storage circuits, such as eFuses or flash memory circuits, that can retain values across on-off power cycles. The IV control vector specifies a range of valid IVs and can have two parts according to the disclosed approaches. One part of the IV control vector specifies a pattern, and another part of the IV control vector specifies a threshold. The upper (most significant) bits of the IV control vector can specify the pattern and the lower (least significant) bits can specify the threshold. For example, if 96 bits (denoted [95:0]) are used to represent the IV control vector, the 64 most significant bits [95:32] can represent the pattern, and the 32 least significant bits [31:0] can represent the threshold.

To determine whether or not an input IV is valid, the configuration controller can first compare a portion of the input IV to the subset of bits of the IV control vector that specify the pattern. If the pattern portion of the input IV does not match the pattern portion of the IV control vector, the configuration controller can signal that the input IV is invalid. If the pattern portion of the input IV matches the pattern portion of the IV control vector, the configuration controller can compare the threshold portion of the input IV to the threshold portion of the IV control vector.

In an exemplary approach, if the threshold portion of the input IV is greater than or equal to the threshold portion of the IV control vector (and the pattern portions matched), the IV is within range and valid. In alternative approaches, the valid range can be strictly greater than the threshold value, less than or equal to the threshold value, or strictly less than the threshold value.

The IV control vector can be changed to invalidate the current range of valid IVs or to reduce the range of valid IVs. In an approach in which the IV control vector is specified by one-time programmable storage circuits, the IV control vector can be changed by changing the state of one or more of the one-time programmable storage circuits. By changing one or more of the pattern bits in the IV control vector, the previous range of valid IVs can be effectively invalidated and a new range established. By changing one or more of the threshold bits in the IV control vector, the range of valid IVs can be reduced.

The following example illustrates the state of the IV control vector beginning with a newly manufactured programmable device and continuing through updates to the IV control vector by a user. The example assumes a 96-bit IV control vector in which the pattern portion is specified in bits [95:32] and the threshold portion is specified in bits [31:0]. The newly manufactured programmable device can have all bits of the pattern portion and threshold portion equal to 0. All bits of the IV control vector being zero-bits provide ~4.3 billion valid IVs. A customer who has purchased the programmable device and desires to restrict the range of valid IVs to 302 values can change the state of the one-time programmable storage circuits of the threshold portion to specify the hexadecimal value 0xFFFFFED2, and change the state of the one-time programmable storage circuits of the pattern portion to specify any hexadecimal value, such as 0x1234567812345678 . . . 12345678. A valid IV must be greater than or equal to 0xFFFFFED2 and have a pattern portion that matches 0x1234567812345678 . . . 12345678. If the customer decides to reduce the range of the valid IVs to 46 IVs, the user can change the state of the one-time programmable storage circuits in the threshold portion of the IV control vector so that the threshold portion has a hexadecimal value of 0xFFFFFFD2. If the customer later decides to invalidate the 46 current IVs, the state of one or more of the one-time programmable storage circuits of the pattern portion of the IV control vector can be changed. For example, the new IV control vector can have a pattern portion equal to hexadecimal 0xF234567812345678 . . . 12345678.

Figure 2:
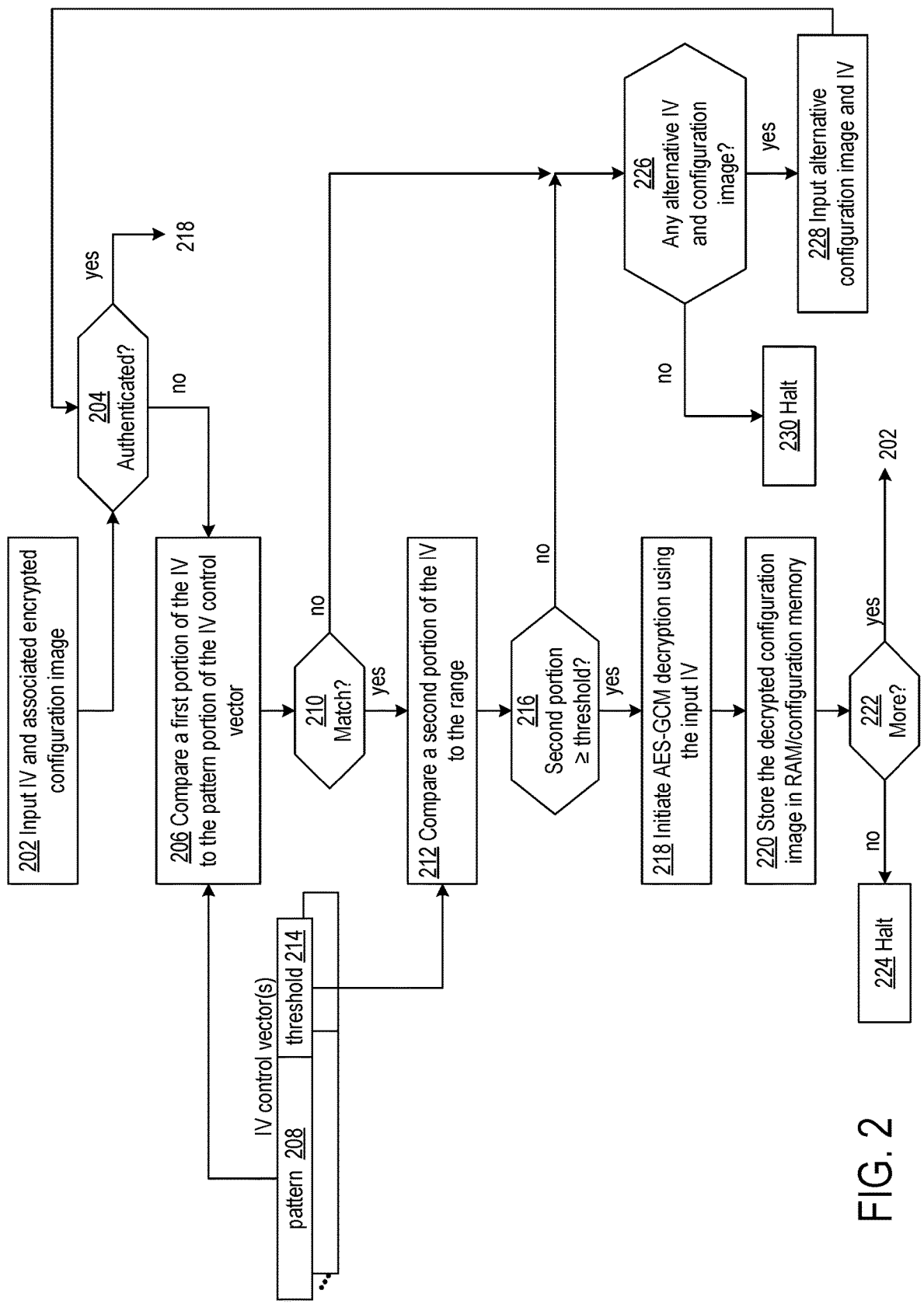
FIG. 2 shows a flowchart of an exemplary process of validating IVs for decrypting encrypted configuration images and configuring a programmable device.

FIG. 2 shows a flowchart of an exemplary process of validating IVs for decrypting encrypted configuration images and configuring a programmable device. The configuration controller determines whether or not the IV is within a range of valid IVs by comparing the input IV to the IV control vector.

At block 202, a configuration controller inputs an encrypted configuration image and an associated IV. In one approach, the configuration controller can implement key rolling. In key rolling, blocks of configuration image ciphertext can include new keys and IVs. Once an initial IV has been authenticated, subsequent IVs no longer need to satisfy the IV control vector. At decision block 204, in response to the initial IV having been authenticated, the process is directed to block 218. Otherwise, validation of the input IV commences at block 206.

At block 206, the configuration controller compares a portion (some number of most significant bits) of the input IV to the pattern portion 208 of the IV control vector. If the portion of the input IV matches the pattern portion of the IV control vector, at decision block 210 the configuration controller directs the process to block 212.

At block 212, the configuration controller compares another portion (some number of least significant bits) of the input IV to the threshold portion 214 of the IV control vector. If the value of the portion of the input IV is greater than or equal to the threshold portion of the IV control vector, at decision block 216 the configuration controller directs the process to block 218.

The configuration controller at block 218 commences AES-GCM decryption using the input IV. At block 220, the plaintext configuration image is stored in the memory of the programmable device. The memory can be a configuration memory for programmable logic or a RAM for storing executable program code.

In one approach, different IV control vectors can be used to authenticate IVs in different blocks of the same configuration image ciphertext. In response to multiple IV control vectors being used for ciphertext of a single configuration image, decision block 222 returns the process to block 202 to input the next block and verify the accompanying IV. Otherwise, the process can halt at block 224.

In response to determining either that the first portion of the input IV does not match the pattern portion 208 of the IV control vector or the second portion of the input IV is less than the threshold portion 214 of the IV control vector, the configuration controller signals that the input IV is invalid and decision blocks 210 or 216 direct the process to decision block 226.

At decision block 226, the configuration controller can determine whether to attempt decryption of an alternative encrypted configuration image having another associated IV or halt processing. If the configuration controller finds that there is an alternative configuration image and IV that have not been processed, the configuration controller can input the unprocessed configuration image and associated IV at block 228 and return the process to decision block 204. If the configuration controller finds that there is no alternative, unprocessed configuration image and associated IV, or the configuration controller has found some number of previously input IVs to be invalid, the process can be directed to block 230. At block 230, the configuration controller can halt processing in order to prohibit further attempts at inputting IVs and decrypting associated configuration images.

Figure 3:
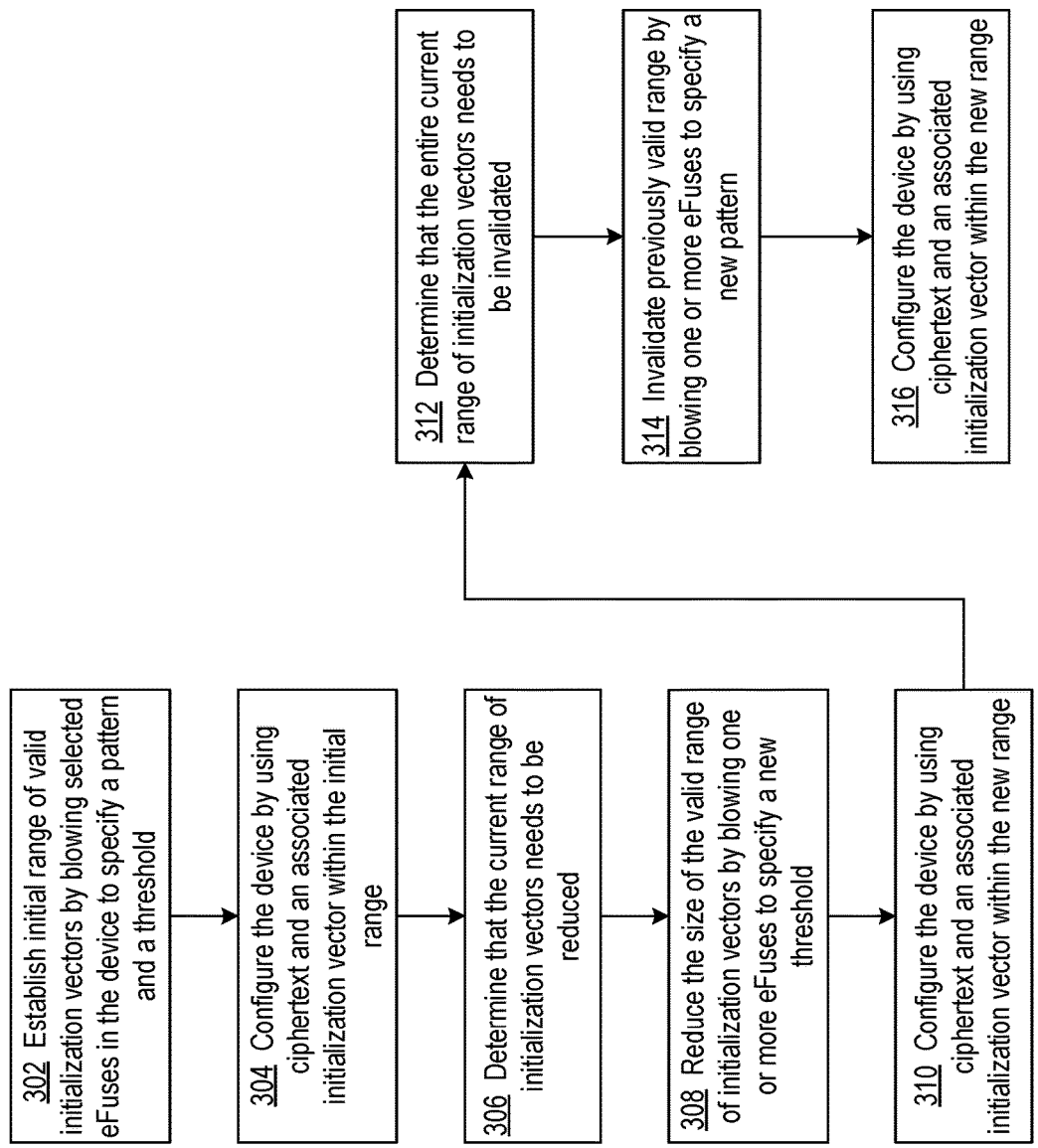
FIG. 3 shows a flowchart of a process in which the range of valid IVs for a programmable device is established and changed in an exemplary scenario.

FIG. 3 shows a flowchart of a process in which the range of valid IVs for a programmable device is established and changed in an exemplary scenario. At block 302, an initial range of valid IVs can be established storing data in selected ones of the one-time programmable storage circuits that specify a pattern and threshold of an IV control vector. To permit many opportunities to change the valid range of IVs, a user can configure fewer one-time programmable storage circuits in the initial pattern. Each one-time programmable storage circuit that is not configured in the initial pattern can be subsequently changed (e.g., from bit value 0 to bit value 1) to establish a new range. A larger number of valid IVs can be established by configuring fewer one-time programmable storage circuits in the threshold portion.

Once the IV control vector in the programmable device has been established, the device can be configured at block 304 by loading an encrypted configuration image and IV by a configuration controller, validating the IV, decrypting the configuration image, and storing the decrypted configuration image in device memory.

At block 306, a user may determine that the number of valid IVs needs to be reduced. For example, a user may desire to reduce the number of valid IVs as a result of improvements in the differential power analysis techniques that would allow adversaries to employ fewer cryptographic operations to recover the secret key. To reduce the number of valid IVs, at block 308 the user can configure one or more of the one-time programmable storage circuits of the threshold portion of the IV control vector. Once the new threshold value has been specified in the IV control vector, the device can be reconfigured at block 310 by loading an encrypted configuration image and new IV, validating the IV, decrypting the configuration image, and storing the decrypted configuration image in device memory.

A user may determine at block 312 that the entire range of currently valid IVs needs to be invalidated. For example, a user may desire to revoke an entire range of currently valid IVs in order to disable use of obsolete versions of configuration data, or to enable a new range of valid IVs if the IVs in the previous range have all been used for new versions of configuration data. To invalidate the current range, at block 314 the user can configure one or more of the one-time programmable storage circuits of the pattern portion of the IV control vector. Once the new pattern has been specified in the IV control vector, the device can be reconfigured at block 316 by loading an encrypted configuration image and new IV, validating the IV, decrypting the configuration image, and storing the decrypted configuration image in device memory.

Figure 4:
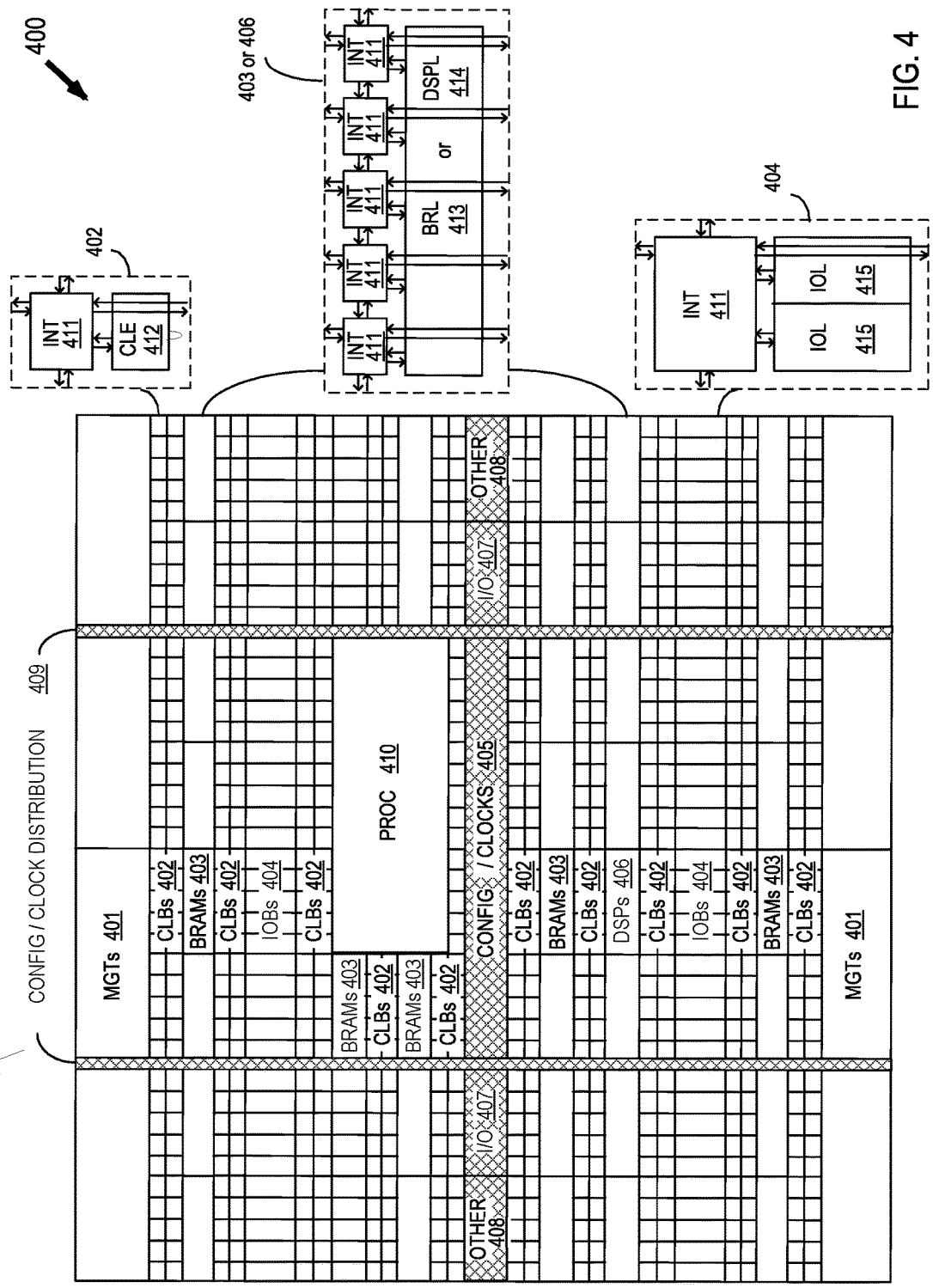
FIG. 4 shows a programmable integrated circuit (IC) on which the disclosed circuits and processes can be implemented.

FIG. 4 shows a programmable integrated circuit (IC) 400 on which the disclosed circuits and processes can be implemented. The programmable IC may also be referred to as a system-on-chip (SoC) that includes field programmable gate array logic (FPGA) along with other programmable resources. FPGA logic may include several different types of programmable logic blocks in the array. For example, FIG. 4 illustrates programmable IC 400 that includes a large number of different programmable tiles including multi-gigabit transceivers (MGTs) 401, configurable logic blocks (CLBs) 402, random access memory blocks (BRAMs) 403, input/output blocks (IOBs) 404, configuration and clocking logic (CONFIG/CLOCKS) 405, digital signal processing blocks (DSPs) 406, specialized input/output blocks (I/O) 407, for example, clock ports, and other programmable logic 408 such as digital clock managers, analog-to-digital converters, system monitoring logic, and so forth. Some programmable IC having FPGA logic also include dedicated processor blocks (PROC) 410 and internal and external reconfiguration ports (not shown).

In some FPGA logic, each programmable tile includes a programmable interconnect element (INT) 411 having standardized connections to and from a corresponding interconnect element in each adjacent tile. Therefore, the programmable interconnect elements taken together implement the programmable interconnect structure for the illustrated FPGA logic. The programmable interconnect element INT 411 also includes the connections to and from the programmable logic element within the same tile, as shown by the examples included at the top of FIG. 4.

For example, a CLB 402 can include a configurable logic element CLE 412 that can be programmed to implement user logic, plus a single programmable interconnect element INT 411. A BRAM 403 can include a BRAM logic element (BRL) 413 in addition to one or more programmable interconnect elements. Typically, the number of interconnect elements included in a tile depends on the height of the tile. The illustrated BRAM tile has the same height as five CLBs, but other numbers (e.g., four) can also be used. A DSP tile 406 can include a DSP logic element (DSPL) 414 in addition to an appropriate number of programmable interconnect elements. An 10B 404 can include, for example, two instances of an input/output logic element (IOL) 415 in addition to one instance of the programmable interconnect element INT 411. As will be clear to those of skill in the art, the actual I/O bond pads connected, for example, to the I/O logic element 415, are manufactured using metal layered above the various illustrated logic blocks, and typically are not confined to the area of the input/output logic element 415.

A columnar area near the center of the die (shown shaded in FIG. 4) is used for configuration, clock, and other control logic. Horizontal areas 409 extending from this column are used to distribute the clocks and configuration signals across the breadth of the programmable IC. Note that the references to "columnar" and "horizontal" areas are relative to viewing the drawing in a portrait orientation.

Some programmable ICs utilizing the architecture illustrated in FIG. 4 include additional logic blocks that disrupt the regular columnar structure making up a large part of the programmable IC. The additional logic blocks can be programmable blocks and/or dedicated logic. For example, the processor block PROC 410 shown in FIG. 4 spans several columns of CLBs and BRAMs.

Note that FIG. 4 is intended to illustrate only an exemplary programmable IC architecture. The numbers of logic blocks in a column, the relative widths of the columns, the number and order of columns, the types of logic blocks included in the columns, the relative sizes of the logic blocks, and the interconnect/logic implementations included at the top of FIG. 4 are purely exemplary. For example, in an actual programmable IC, more than one adjacent column of CLBs is typically included wherever the CLBs appear, to facilitate the efficient implementation of user logic.

Figure 5:
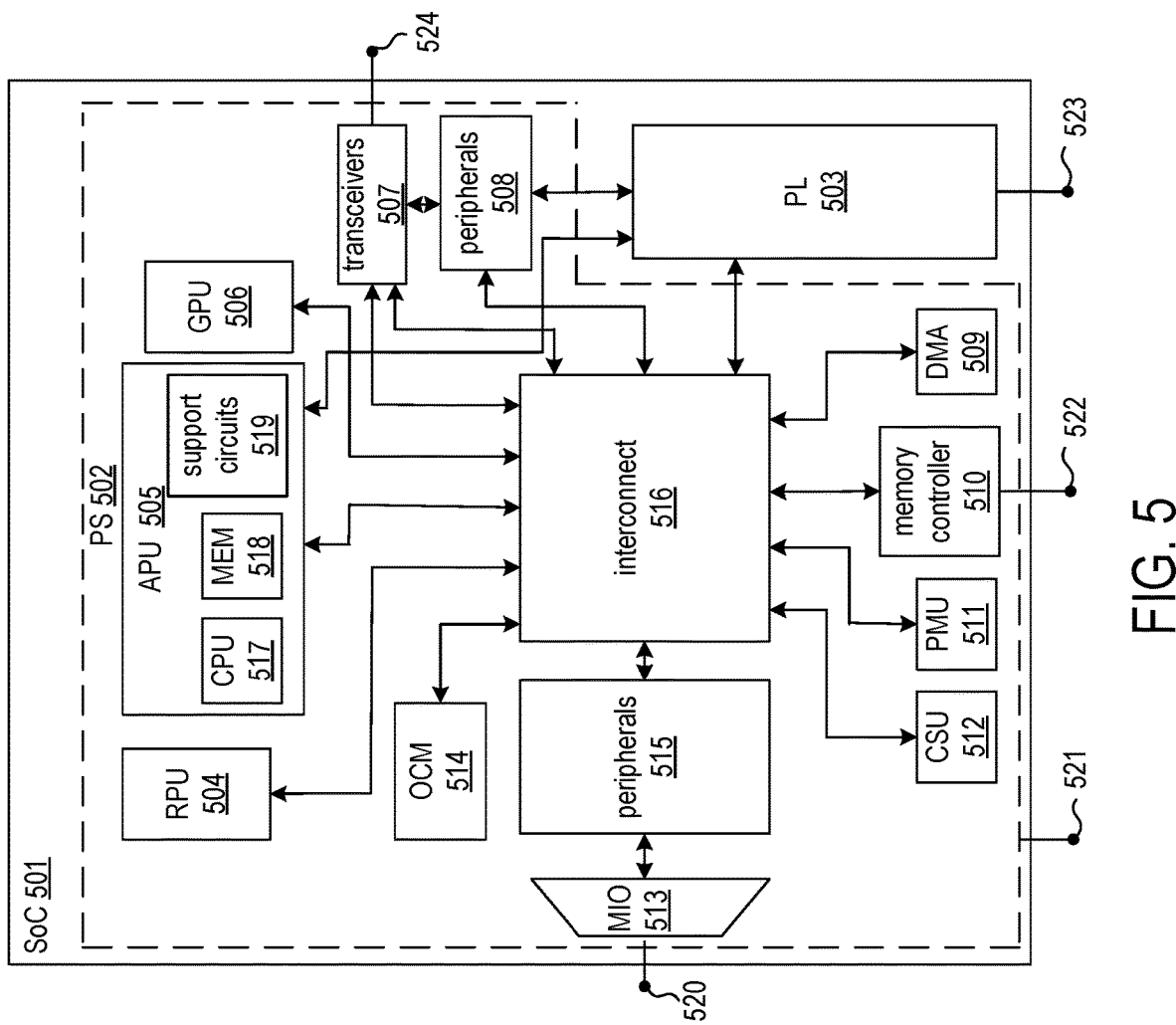
FIG. 5 is a block diagram depicting a System-on-Chip (SoC) that can host the disclosed configuration controller and IV control vector according to an example.

FIG. 5 is a block diagram depicting a System-on-Chip (SoC) 501 that can host the disclosed configuration controller and IV control vector according to an example. In the example, the SoC includes the processing subsystem (PS) 502 and the programmable logic subsystem 503. The processing subsystem 502 includes various processing units, such as a real-time processing unit (RPU) 504, an application processing unit (APU) 505, a graphics processing unit (GPU) 506, a configuration and security unit (CSU) 512, and a platform management unit (PMU) 511. The PS 502 also includes various support circuits, such as on-chip memory (OCM) 514, transceivers 507, peripherals 508, interconnect 516, DMA circuit 509, memory controller 510, peripherals 515, and multiplexed (MIO) circuit 513. The processing units and the support circuits are interconnected by the interconnect 516. The PL subsystem 503 is also coupled to the interconnect 516. The transceivers 507 are coupled to external pins 524. The PL 503 is coupled to external pins 523. The memory controller 510 is coupled to external pins 522. The MIO 513 is coupled to external pins 520. The PS 502 is generally coupled to external pins 521. The APU 505 can include a CPU 517, memory 518, and support circuits 519. The APU 505 can include other circuitry, including L1 and L2 caches and the like. The RPU 504 can include additional circuitry, such as L1 caches and the like. The interconnect 516 can include cache-coherent interconnect or the like.

Referring to the PS 502, each of the processing units includes one or more central processing units (CPUs) and associated circuits, such as memories, interrupt controllers, direct memory access (DMA) controllers, memory management units (MMUs), floating point units (FPUs), and the like. The interconnect 516 includes various switches, busses, communication links, and the like configured to interconnect the processing units, as well as interconnect the other components in the PS 502 to the processing units.

The OCM 514 includes one or more RAM modules, which can be distributed throughout the PS 502. For example, the OCM 514 can include battery backed RAM (BBRAM), tightly coupled memory (TCM), and the like. The memory controller 510 can include a DRAM interface for accessing external DRAM. The peripherals 508, 515 can include one or more components that provide an interface to the PS 502. For example, the peripherals can include a graphics processing unit (GPU), a display interface (e.g., DisplayPort, high-definition multimedia interface (HDMI) port, etc.), universal serial bus (USB) ports, Ethernet ports, universal asynchronous transceiver (UART) ports, serial peripheral interface (SPI) ports, general purpose (GPIO) ports, serial advanced technology attachment (SATA) ports, peripheral component interconnect express (PCIe) ports, and the like. The peripherals 515 can be coupled to the MIO 513. The peripherals 508 can be coupled to the transceivers 507. The transceivers 507 can include serializer/deserializer (SERDES) circuits, MGTs, and the like.

Though aspects and features may in some cases be described in individual figures, it will be appreciated that features from one figure can be combined with features of another figure even though the combination is not explicitly shown or explicitly described as a combination.

The methods and circuits are thought to be applicable to a variety of systems for decrypting configuration images.

Other aspects and features will be apparent to those skilled in the art from consideration of the specification. The methods and circuits may be implemented as one or more processors configured to execute software, as an application specific integrated circuit (ASIC), or as a logic on a programmable logic device. It is intended that the specification and drawings be considered as examples only, with a true scope of the invention being indicated by the following claims.

What is claimed is:

1. A method comprising: inputting a first initialization vector and associated ciphertext to a configuration control circuit; determining by the configuration control circuit whether or not the first initialization vector is within a range of a plurality of valid initialization vectors; decrypting the ciphertext into first plaintext by the configuration control circuit using the first initialization vector in response to determining that the first initialization vector is within the range of the plurality of valid initialization vectors; configuring a memory circuit with the first plaintext after the decrypting; signaling that the first initialization vector is invalid by the configuration control circuit in response to determining that the first initialization vector is outside the range of the plurality of valid initialization vectors; inputting a second initialization vector and associated ciphertext; determining by the configuration control circuit whether or not the second initialization vector is within the range of the plurality of valid initialization vectors; decrypting the ciphertext associated with the second initialization vector into second plaintext by the configuration control circuit using the second initialization vector in response to determining that the second initialization vector is within the range of the plurality of valid initialization vectors.

2. The method of claim 1, further comprising:
configuring a memory circuit with the second plaintext after the decrypting; and
signaling that the second initialization vector is invalid by the configuration control circuit in response to determining that the second initialization vector is outside the range of the plurality of valid initialization vectors.

3. The method of claim 1, wherein the determining includes inputting a value specified by states of a plurality of one-time programmable storage circuits that specify the range of the plurality of valid initialization vectors.

4. The method of claim 3, wherein:
a first subset of the plurality of one-time programmable storage circuits specify a pattern, and a second subset of the plurality of one-time programmable storage circuits specify a threshold; and
the determining includes:
comparing a first portion of the first initialization vector to the first subset of the plurality of one-time programmable storage circuits,
comparing a second portion of the first initialization vector to the second subset of the plurality of one-time programmable storage circuits, and
determining that the first initialization vector is within the range of the plurality of valid initialization vectors in response to:
the first portion of the first initialization vector matching the first subset of the plurality of one-time programmable storage circuits and,
a value of the second portion of the first initialization vector being greater than or equal to a value of the second subset of the plurality of one-time programmable storage circuits.

5. The method of claim 4, further comprising changing the pattern to another pattern by changing state of one or more of the first subset of the plurality of one-time programmable storage circuits, rendering invalid all previously valid initialization vectors.

6. The method of claim 4, further comprising changing the threshold to another threshold by changing state of one or more of the second subset of the plurality of one-time programmable storage circuits, reducing a number of previously valid initialization vectors.

7. The method of claim 1, wherein:
a first subset of a plurality of bits specify a pattern, and a second subset of the plurality of bits specify a threshold; and
the determining includes:
comparing a first portion of the first initialization vector to the first subset of the plurality of bits,
comparing a second portion of the first initialization vector to the second subset of the plurality of bits, and
determining that the first initialization vector is within the range of the plurality of valid initialization vectors in response to:
the first portion of the first initialization vector matching the first subset of the plurality of bits and,
a value of the second portion of the first initialization vector being greater than or equal to a value of the second subset of the plurality of bits.

8. The method of claim 1, wherein the configuring includes storing the first plaintext in configuration memory of programmable logic circuitry.

9. The method of claim 1, wherein the configuring includes storing the first plaintext as program code that is executable by a processor of a system-on-chip.

10. A circuit arrangement comprising:
storage circuitry configured to store an initialization control vector that specifies a range of a plurality of valid initialization vectors;
a memory circuit;
a configuration control circuit coupled to the storage circuitry and to the memory circuit, the configuration control circuit configured to:
input a first initialization vector and associated ciphertext;
determine whether or not the first initialization vector is within the range of the plurality of valid initialization vectors;
decrypt the ciphertext into first plaintext using the first initialization vector in response to determining that the first initialization vector is within the range of the plurality of valid initialization vectors;
store the first plaintext in the memory circuit; and
signal that the first initialization vector is invalid in response to determining that the first initialization vector is outside the range of the plurality of valid initialization vectors;
input a second initialization vector and associated ciphertext;
determining by the configuration control circuit whether or not the second initialization vector is within the range of the plurality of valid initialization vectors;
decrypt the ciphertext associated with the second initialization vector into second plaintext by the configuration control circuit using the second initialization vector in response to determining that the second initialization vector is within the range of the plurality of valid initialization vectors.

11. The circuit arrangement of claim 10, wherein the configuration control circuit is configured to:
configure a memory circuit with the second plaintext after the decrypting; and
signal that the second initialization vector is invalid by the configuration control circuit in response to determining that the second initialization vector is outside the range of the plurality of valid initialization vectors.

12. The circuit arrangement of claim 10, wherein:
the storage circuitry includes a plurality of one-time programmable storage circuits; and
wherein the configuration control circuit is configured to input a value represented by states of the plurality of one-time programmable storage circuits and indicating the range of the plurality of valid initialization vectors.

13. The circuit arrangement of claim 12, wherein:
a first subset of the plurality of one-time programmable storage circuits specify a pattern, and a second subset of the plurality of one-time programmable storage circuits specify a threshold; and
the configuration control circuit is configured to:
compare a first portion of the first initialization vector to the first subset of the plurality of one-time programmable storage circuits,
compare a second portion of the first initialization vector to the second subset of the plurality of one-time programmable storage circuits, and
determine that the first initialization vector is within the range of the plurality of valid initialization vectors in response to:
the first portion of the first initialization vector matching the first subset of the plurality of one-time programmable storage circuits and,
a value of the second portion of the first initialization vector being greater than or equal to a value of the second subset of the plurality of one-time programmable storage circuits.

14. The circuit arrangement of claim 13, wherein the configuration control circuit is configured to change the pattern to another pattern by changing state of one or more of the first subset of the plurality of one-time programmable storage circuits, rendering invalid all previously valid initialization vectors.

15. The circuit arrangement of claim 13, the configuration control circuit is configured to change the threshold to another threshold by changing state of one or more of the second subset of the plurality of one-time programmable storage circuits, reducing a number of previously valid initialization vectors.

16. The circuit arrangement of claim 10, wherein:
a first subset of a plurality of bits specify a pattern, and a second subset of the plurality of bits specify a threshold; and
the configuration control circuit is configured to:
compare a first portion of the first initialization vector to the first subset of the plurality of bits,
compare a second portion of the first initialization vector to the second subset of the plurality of bits, and
determine that the first initialization vector is within the range of the plurality of valid initialization vectors in response to:
the first portion of the first initialization vector matching the first subset of the plurality of bits and,
a value of the second portion of the first initialization vector being greater than or equal to a value of the second subset of the plurality of bits.

17. The circuit arrangement of claim 10, wherein the configuration control circuit is configured to store the first plaintext in configuration memory of programmable logic circuitry.

18. The circuit arrangement of claim 10, wherein the configuration control circuit is configured to store the first plaintext as program code that is executable by a processor of a system-on-chip.

19. The circuit arrangement of claim 10, wherein:
the storage circuitry includes a plurality of eFuses; and
the configuration control circuit is configured to input a value represented by states of the plurality of eFuses and indicating the range of the plurality of valid initialization vectors.

20. The circuit arrangement of claim 10, wherein:
the storage circuitry includes a flash memory circuit; and
the configuration control circuit is configured to read a value from the flash memory circuit indicating the range of the plurality of valid initialization vectors.

* * * * *